(12) United States Patent
Randall et al.

(10) Patent No.: US 12,528,359 B2
(45) Date of Patent: Jan. 20, 2026

(54) PANTOGRAPH ASSEMBLY WITH FORCE DAMPENERS

(71) Applicant: Caterpillar Inc., Peoria, IL (US)

(72) Inventors: Jacob Dean Randall, Peoria Heights, IL (US); Richard Eugene Hogan, Dunlap, IL (US); Nimesh Akalanka Jayakody, Springfield, IL (US); Praveen Kumar Jonnavittula, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 838 days.

(21) Appl. No.: 17/814,148

(22) Filed: Jul. 21, 2022

(65) Prior Publication Data

US 2024/0025261 A1 Jan. 25, 2024

(51) Int. Cl.
| | |
|---|---|
| *B60L 5/12* | (2006.01) |
| *B60L 5/08* | (2006.01) |
| *B60L 5/19* | (2006.01) |
| *B60L 5/24* | (2006.01) |
| *B60L 5/28* | (2006.01) |
| *B60L 50/53* | (2019.01) |

(52) U.S. Cl.
CPC ........ *B60L 5/12* (2013.01); *B60L 5/08* (2013.01); *B60L 5/19* (2013.01); *B60L 5/24* (2013.01); *B60L 5/28* (2013.01); *B60L 50/53* (2019.02); *B60L 2200/40* (2013.01)

(58) Field of Classification Search
CPC ...... B60L 5/12; B60L 5/08; B60L 5/24; B60L 5/28; B60L 5/19; B60L 50/53; B60L 2200/40

USPC ........................................................ 191/59.1
See application file for complete search history.

(56) References Cited

U.S. PATENT DOCUMENTS

| | | | | |
|---|---|---|---|---|
| 1,333,607 A | * | 3/1920 | Colby | ........................ B60L 5/08 |
| | | | | 191/66 |
| 9,937,799 B2 | | 4/2018 | Doddakula | |
| 10,894,468 B2 | | 1/2021 | Nakamura et al. | |
| 2015/0034441 A1 | * | 2/2015 | Nakajima | ................ B60L 50/13 |
| | | | | 191/59.1 |
| 2015/0136555 A1 | * | 5/2015 | Kanazawa | ................. B60L 9/00 |
| | | | | 191/59.1 |
| 2017/0113554 A1 | * | 4/2017 | Doddakula | ............... B60L 5/08 |
| | | | (Continued) | |

FOREIGN PATENT DOCUMENTS

| | | | | | |
|---|---|---|---|---|---|
| CN | 103935249 A | * | 7/2014 | ................. | B60L 5/02 |
| CN | 207466376 U | * | 6/2018 | | |
| DE | 1046090 B | * | 12/1958 | | |
| | (Continued) | | | | |

OTHER PUBLICATIONS

Written Opinion and International Search Report for Int'l. Patent Appln. No. PCT/US2023/069467, mailed Oct. 30, 2023 (11 pgs).

*Primary Examiner* — S. Joseph Morano
*Assistant Examiner* — James William Jones
(74) *Attorney, Agent, or Firm* — Lee & Hayes, PLLC

(57) ABSTRACT

A pantograph assembly includes one or more force dampeners. When the pantograph is in a lowered position, the force dampeners absorb forces imparted onto the pantograph assembly by the movement of a work machine to which the pantograph assembly is installed. Additionally, in some examples, the pantograph assembly includes a support frame that provides structural rigidity to an A-frame.

18 Claims, 5 Drawing Sheets

(56) References Cited

U.S. PATENT DOCUMENTS

2020/0009955 A1* 1/2020 Nakamura ............... B60K 1/00

FOREIGN PATENT DOCUMENTS

| EP | 1792769 A1 | 6/2007 | |
|---|---|---|---|
| KR | 20080051978 A * | 6/2008 | ............. B32B 9/007 |
| KR | 101385228 B1 * | 4/2014 | ................ B60L 5/24 |
| WO | WO2014041005 A1 | 3/2014 | |
| WO | WO-2015075773 A1 * | 5/2015 | ................ B60L 5/30 |

* cited by examiner

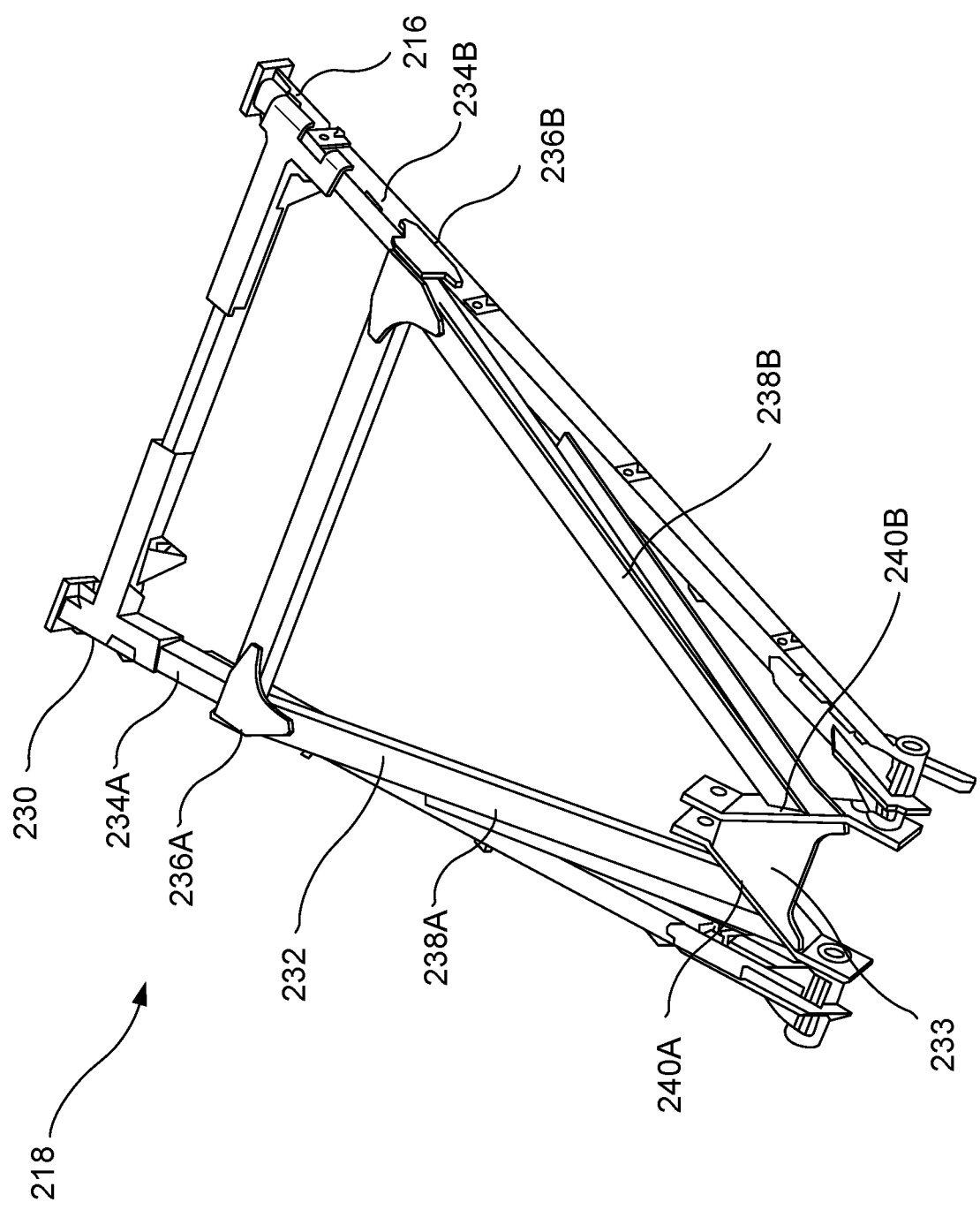

PANTOGRAPH ASSEMBLY WITH FORCE DAMPENERS

TECHNICAL FIELD

The present disclosure relates to trolley-assist vehicles, and more particularly to a pantograph assembly for a trolley-assist vehicle.

BACKGROUND

Machines such as trolley-assist vehicles or electric locomotives generally employ a pantograph assembly to provide electric power to the machine. Typically, the pantograph assembly is carried on top of the machine. The pantograph assembly is configured to draw power from an overhead conductor and transfer it to the machine. On machines such as off-highway trucks, the pantograph is raised and lowered to make a connection with overhead conductors. During use, a pantograph assembly can experience forces in various directions caused by the movement of the vehicle to which the pantograph is installed as the vehicle travels along the path or road. These forces can become significant when the vehicle is used on paths or roads that are not even or flat. The forces applied to the pantograph can cause wear and tear on the pantograph, both in the extended or engaged (energized) position and the retracted, lowered, or disengaged (deenergized) position, and positions in between if not fully extended or retracted.

Technologies have been used to provide structural rigidity to pantograph assemblies. An example of a pantograph assembly that utilizes members to increase structural rigidity is described in EP patent application No. EP1792769 (hereinafter referred to as "the '769 application"). The '769 application discloses a pantograph for use in a train or other vehicle. The '769 application describes the use of a stop leg that supports the weight of at least part of the pantograph. The system of the '769 application is described as, for example, providing support to one or more beams of the pantograph in order to reduce the deformation of such beams. Although the system described in the '769 application is configured to support the weight of various components of the pantograph assembly in a vertical direction, the disclosed system is not configured to stabilize or otherwise support the pantograph assembly in operating conditions in which lateral or torsional forces are imparted to various components of the pantograph assembly. Such forces are commonly caused by erratic or spurious movements of a work machine as the work machine travels along a potentially undulating or bumpy path. As a result, the pantograph assembly described in the '769 application is likely to suffer from premature failure.

Examples of the present disclosure are directed to overcoming deficiencies of such systems.

SUMMARY

One aspect of the presently disclosed subject matter describes a work machine having an electric motor, a pantograph assembly providing a first source of electrical power to the electric motor. The pantograph assembly provides a first source of electrical power to the electric motor and includes a pan head comprising at least one conductive brush for receiving electrical power from an overhead conductor when the pan head is in an extended position whereby the conductive brush is in electrical contact with the overhead conductor, a base frame connected to the work machine, an articulated assembly connected to the base frame, the articulated assembly comprising a first link hingedly connected to the base frame, and further comprising a second link hingedly connected to the first link, a lifting mechanism configured to force the second link to rotate with respect to the first link, thereby raising the pan head to the extended position from a lowered position, a pan base connected to the base frame, the pan base configured to receive the pan head when the pan head is in the lowered position, and at least one force dampener to absorb at least a portion of a force imparted by a work machine movement onto the pan head when the pan head is in the lowered position. The force dampener includes an upper section connected to the pan head, the upper section comprising an engagement mechanism, a lower section connected to the pan base, wherein at least a portion of the lower section comprises a deformable material, the engagement mechanism engages with a receiving section of the lower section when the pan head is in the lowered position, and the deformable material is configured to absorb at least a portion of energy imparted to the pan head, via the engagement mechanism, due to relative motion between the pan head and the pan base.

In another aspect, the presently disclosed subject matter describes a pantograph assembly. The pantograph assembly includes a pan head comprising at least one conductive brush for receiving electrical power from an overhead conductor when the pan head is in an extended position and the conductive brush is in electrical contact with the overhead conductor, a base frame configured to be connected to a work machine, an articulated assembly connected to the base frame, the articulated assembly comprising a first link hingedly connected to the base frame, and a second link hingedly connected to the first link, a lifting mechanism which, when engaged, causes the second link to rotate with respect to the first link, thereby raising the pan head to the extended position from a lowered position, a pan base connected to the base frame, the pan base configured to receive the pan head when the pan head is in the lowered position, and at least one force dampener to absorb at least a portion of a force imparted by a motion of the pantograph assembly onto the pan head when the pan head is in the lowered position. The force dampener includes an upper section connected on the pan head, the upper section comprising an engagement mechanism, a lower section connected on the pan base, wherein at least a portion of the lower section comprises a deformable material, wherein the engagement mechanism of the upper section engages with a receiving section of the lower section when the pan head is in the lowered position, and the deformable material configured to absorb at least a portion of energy imparted onto the pan head transferred through the engagement mechanism caused by a relative motion of between the pan head and the pan base.

In a still further aspect, the presently disclosed subject matter describes a force dampener for a pantograph assembly, the force dampener includes an upper section configured to be installed on a pan head, the upper section comprising an engagement mechanism, a lower section configured to be installed on a pan base, wherein at least a portion of the lower section comprises a deformable material, wherein the engagement mechanism of the upper section engages with a receiving section of the lower section when the pan head is in the lowered position, and the deformable material configured to absorb at least a portion of energy imparted by a work machine movement onto the pan head transferred through the engagement mechanism caused by a relative motion of between the pan head and the pan base.

BRIEF DESCRIPTION OF DRAWINGS

FIG. 5 illustrates a link, an A-frame, a support frame, and a load block, in accordance with one or more examples of the present disclosure.

DETAILED DESCRIPTION

Systems and technologies described below are directed to pantograph assemblies using force dampeners. Wherever possible, the same reference numbers will be used throughout the drawings to refer to the same or like parts.

Figure 1:
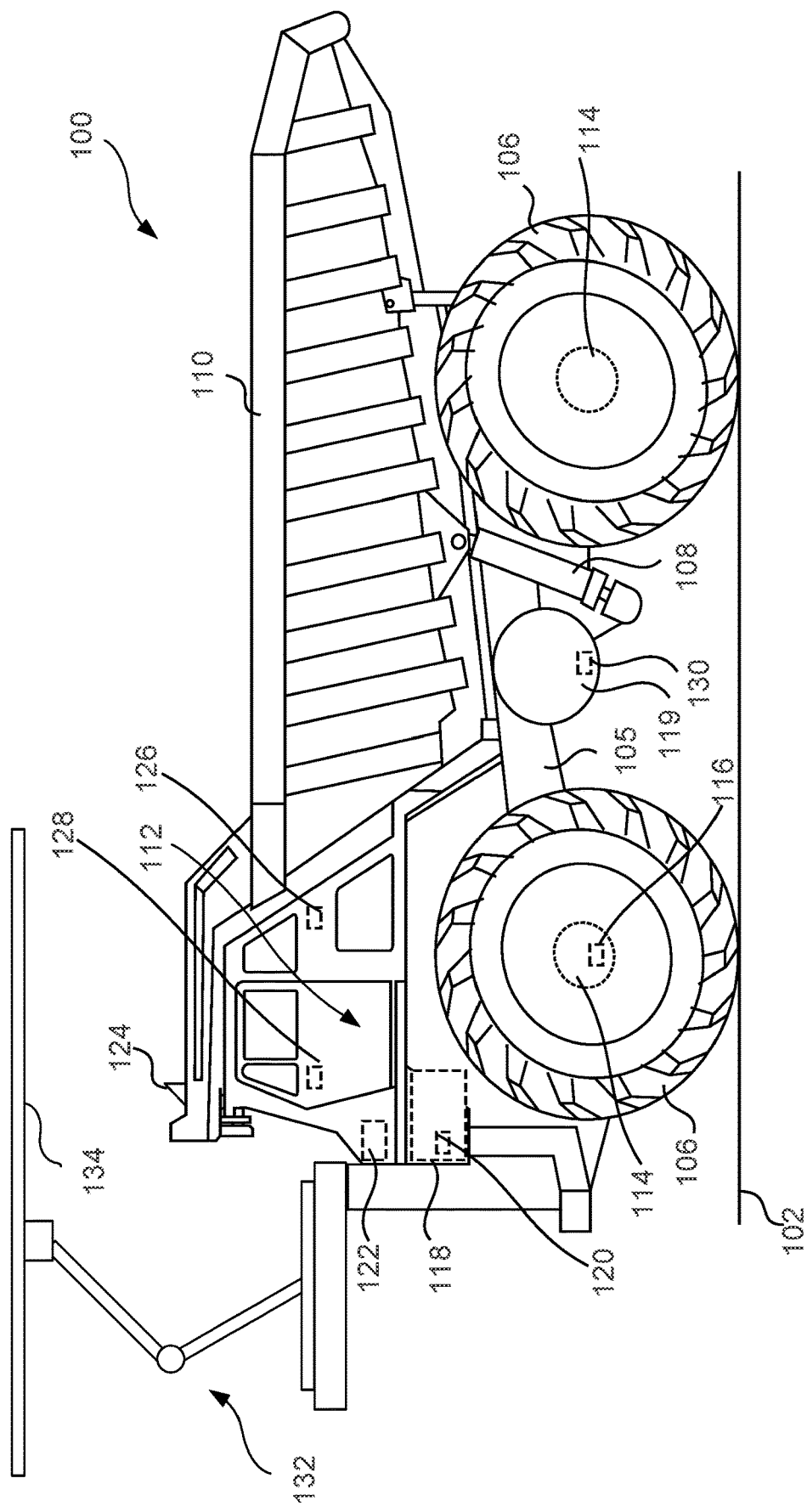
FIG. 1 illustrates a work machine that travels over a surface, in accordance with one or more examples of the disclosure.

FIG. 1 is a schematic illustration of a work machine 100 that travels over a surface 102, in accordance with examples of the disclosure. The work machine 100, although depicted as a mining truck or haul truck, may be any suitable machine, such as any type of loader, dozer, dump truck, skid loader, excavator, compaction machine, backhoe, combine, crane, drilling equipment, tank, trencher, tractor, any suitable stationary machine, any variety of generator, locomotive, marine engines, combinations thereof, or the like. In some examples, the work machine can be a hybrid system, an electric vehicle (no internal combustion engine), or use internal combustion as the primary source of energy. The presently disclosed subject matter is not limited to any particular platform of use and may be implemented across various types of vehicles, installations (i.e., non-vehicle uses), and the like. The work machine 100 of FIG. 1 is merely for purposes of illustration.

As shown in FIG. 1, the work machine 100 includes a frame 105 and wheels 106. The wheels 106 are mechanically coupled to a drive train (not shown) to propel the work machine 100. When the wheels 106 of the work machine 100 are caused to rotate, the work machine 100 traverses the surface 102. Although illustrated in FIG. 1 as having a hub with a rubber tire, in other examples, the wheels 106 may instead be in the form of drums, chain drives, tracks, combinations thereof, or the like. The frame 105 of the work machine 100 is constructed from any suitable materials, such as iron, steel, aluminum, other metals, ceramics, plastics, combination thereof, or the like. The frame 105 is of a unibody construction in some cases, and in other cases, is constructed by joining two or more separate body pieces. Parts of the frame 105 are joined by any suitable variety of mechanisms, including, for example, welding, bolts, screws, other fasteners, epoxy, combinations thereof, or the like.

The work machine 100 may include a hydraulic system 108 that move a dump box 110 or other moveable elements configured to move, lift, carry, and/or dump materials. The dump box 110 is used, for example, to pick up and carry dirt or mined ore from one location on the surface 102 to another location of the surface 102. The dump box 110 is actuated by the hydraulic system 108, or any other suitable mechanical system. In some cases, the hydraulic system 108 is powered by an electric motor (not shown), such as by powering hydraulic pump(s) (not shown) of the hydraulic system 108. It should be noted that in other types of machines (e.g., machines other than a mining truck) the hydraulic system 108 may be in a different configuration than the one shown herein, may be used to operate elements other than a dump box 110, and/or may be omitted.

With continued reference to FIG. 1, the work machine 100 also includes an operator station 112. The operator station 112 is configured to seat an operator (not shown) therein. The operator seated in the operator station 112 interacts with various control interfaces and/or actuators within the operator station 112 to control movement of various components of the work machine 100 and/or the overall movement of the work machine 100 itself. Thus, control interfaces and/or actuators within the operator station 112 allow the control of the propulsion of the work machine 100 by controlling operation of one or more motors 114 that are electric motors, the motors 114 being controlled by a motor controller 116 and powered by a battery 118. The motor controller 116 may be controlled according to operator inputs received at the operator station 112. A battery controller 120 monitors and controls various aspects of the battery 118, such as controlling a temperature of the battery or preventing an over discharge condition.

The motors 114 may be of any suitable type, such as induction motors, permanent magnet motors, switched reluctance (SR) motors, combinations thereof, or the like. The motors 114 are of any suitable voltage, current, and/or power rating. The motors 114 when operating together are configured to propel the work machine 100 as needed for tasks that are to be performed by the work machine 100. For example, the motors 114 may be rated for a range of about 500 volts to about 3000 volts. The motor controller 116 include one or more control electronics to control the operation of the motors 114. In some cases, each motor 114 may be controlled by its own motor controller 116. In other cases, all the motors of the work machine 100 may be controlled by a single motor controller 116. The motor controller 116 may further include one or more inverters or other circuitry to control the energizing of magnetic flux generating elements (e.g., coils) of the motors 114. The motors 114 are mechanically coupled to a variety of drive train components, such as a drive shaft and/or axles or directly to the wheels 106 to rotate the wheels 106 and propel the work machine 100. The drivetrain includes any variety of other components including, but not limited to a differential, connector(s), constant velocity (CV) joints, etc.

Although not shown here, there may be one or more motors 114 that are not used for propulsion of the work machine 100, but rather to operate pumps and/or other auxiliary components, such as to operate the hydraulic systems 108. According to examples of the disclosure, the power to energize the motors 114 is received from the battery 118. It should be noted that, in some cases, the battery 118 may provide power for operating the motors 114 and/or other power consuming components (e.g., controllers, cooling systems, displays, actuators, sensors, etc.) of the work machine 100. As noted above, the presently disclosed subject matter is not limited solely to the use of battery power, as other forms of energy may be used in conjunction with the power provided by the battery 118, including, but not limited to, internal combustion engines or fuel cells.

The battery 118 may be of any suitable type and capacity. For example, the battery may be a lithium-ion battery, a lead-acid battery, an aluminum ion battery, a flow battery, a magnesium ion battery, a potassium ion battery, a sodium ion battery, a metal hydride battery, a nickel metal hydride battery, a cobalt metal hydride battery, a nickel-cadmium battery, a wet cell of any type, a dry cell of any type, a gel battery, combinations thereof, or the like. The battery 118 may be organized as a collection of electrochemical cells arranged to provide the voltage, current, and/or power requirements of the motors 114. In some cases, the energy capacity of the battery 118 relative to the energy available from a full fuel tank 119 may be in the range of about 0.2 to about 1.5. In other cases, the energy capacity of the battery 118 relative to the energy available from a full fuel tank 119 (which would be provided if work machine 100 includes a combustion engine such as a reciprocating internal combustion engine or turbine (not shown)) may be in the range of about 0.5 to about 1.0. In still other cases, the energy capacity of the battery 118 relative to the energy available from a full fuel tank 119 may be in the range of about 0.7 to about 0.9. It should be understood that the aforementioned ratios are examples, and the disclosure contemplates the battery 118 energy capacity to the fuel tank 119 energy capacity ratios in ranges outside of the aforementioned ranges.

The work machine 100 includes an engine control module (ECM) 122 that controls various aspects of the work machine 100. The ECM 122 is configured to receive battery status (e.g., state-of-charge (SOC) or other charge related metrics) from the battery controller 120, fuel level from the fuel tank controller 130, operator signal(s), such as an accelerator signal, based at least in part on the operator's interactions with one or more control interfaces and/or actuators of the work machine 100. In other cases, the ECM 122 may receive control signals from a remote-control system by wireless signals received via an antenna 124. The ECM 122 uses the operator signal(s), regardless of whether they are received from an operator in the operator station 112 or from a remote controller, to generate command signals to control various components of the work machine 100. For example, the ECM 122 may control the motors 114 via the motor controller 116, the hydraulic system 108, and/or steering of the work machine 100 via a steering controller 126. It should be understood that the ECM 122 may control any variety of other subsystems of the work machine 100 that are not explicitly discussed here to provide the work machine 100 with the operational capability discussed herein.

The ECM 122, according to example of this disclosure, may be configured to provide an indication of remaining energy to operate the work machine 100 on an energy gauge 128. The energy gauge 128, according to examples of the disclosure, may be configured to display the amount of energy available to operate the work machine 100 based at least in part on the amount of charge remaining in the battery 118. In some cases, the energy gauge 128 may provide an indication of an estimated amount of time the work machine 100 can be operated and/or an estimated amount of range the work machine 100 has remaining. These estimates may be generated based on the amount of charge remaining in the battery 118, the recent usage of energy by the work machine 100, and/or an estimate of the energy expended per unit time (e.g., power requirement) of a task in which the work machine 100 is engaged. The energy gauge 128 may be configured to display, to an operator seated in the operator station 112, the amount of energy, time, and/or range remaining for operating the work machine 100. Additionally, or alternatively, the energy gauge 128 and/or the ECM 122 may be configured to indicate, such as wirelessly via the antenna 124, the amount of energy, time, and/or range remaining for operating the work machine 100 to a remote operating system.

The ECM 122 includes single or multiple microprocessors, field programmable gate arrays (FPGAs), digital signal processors (DSPs), and/or other processors or components configured to control the work machine 100. Numerous commercially available microprocessors can be configured to perform the functions of the ECM 122. Various known circuits are operably connected to and/or otherwise associated with the ECM 122 and/or the other circuitry of the work machine 100. Such circuits and/or circuit components include power supply circuitry, inverter circuitry, signal-conditioning circuitry, actuator driver circuitry, etc. Additionally, such circuits and/or circuit components may comprise hardware components and/or software components, and one or more such components (e.g., software components) may be stored in a memory associated with the ECM 122. The present disclosure, in any manner, is not restricted to the type of ECM 122 or the positioning depicted of the ECM 122 and/or the other components relative to the work machine 100. The ECM 122 is configured to control the use of energy from the battery 118 in a manner that enhances the range of the work machine 100.

The work machine 100 further includes any number of other components within the operator station 112 and/or at one or more other locations on the frame 105. These components include, for example, one or more location sensors (e.g., global positioning system (GPS)), an air conditioning system, a heating system, communications systems (e.g., radio, Wi-Fi connections), collision avoidance systems, sensors, cameras, etc. These systems are powered by any suitable mechanism, such as by using a direct current (DC) power supply powered by the battery 118.

The work machine 100 may further include a pantograph assembly 132 mounted at the front of the work machine 100, or otherwise connected to and/or supported by the frame 105. Alternatively, the work machine 100 may include two or more pantograph assemblies 132 connected to and/or supported by the frame 105. In such examples, the two or more pantograph assemblies can be controlled to be raised and lowered together. The pantograph assembly 132 may be configured to supply electrical power from overhead conductors 134 to the work machine 100. Electrical power from the overhead conductors 134 may act as a power source to assist in propulsion of the work machine 100 or provide electrical power for other uses. The pantograph assembly 132 may shortcut the battery 118, or other source of electrical power, thereby directly providing electrical power to the motors 114. For simplicity in description and clarity of illustration, the electrical components of the pantograph assembly 132 are not shown in the drawings except where the components are helpful for a complete description of the embodiments in accordance with the present disclosure. Further, it should be noted that the pantograph assembly 132 may be used in conjunction with an internal combustion engine (not shown), with or without a battery 118, and other configurations.

As the work machine 100 traverses the surface 102, and while the pantograph assembly 132 is in a retracted position, uneven portions of the surface 102 may impart forces upon the pantograph assembly 132 due to the movement of the work machine 100 caused by the uneven surface 102. To reduce the probability of damage to the pantograph assembly 132 caused by such forces, the pantograph assembly 132 includes one or more force dampeners that absorb at least a portion of the forces imparted on the pantograph assembly 132. Example assemblies, systems, and/or other components associated with the pantograph assembly 132 and configured to absorb and/or resist such forces will be explained in more detail in the figures below.

Figure 2:
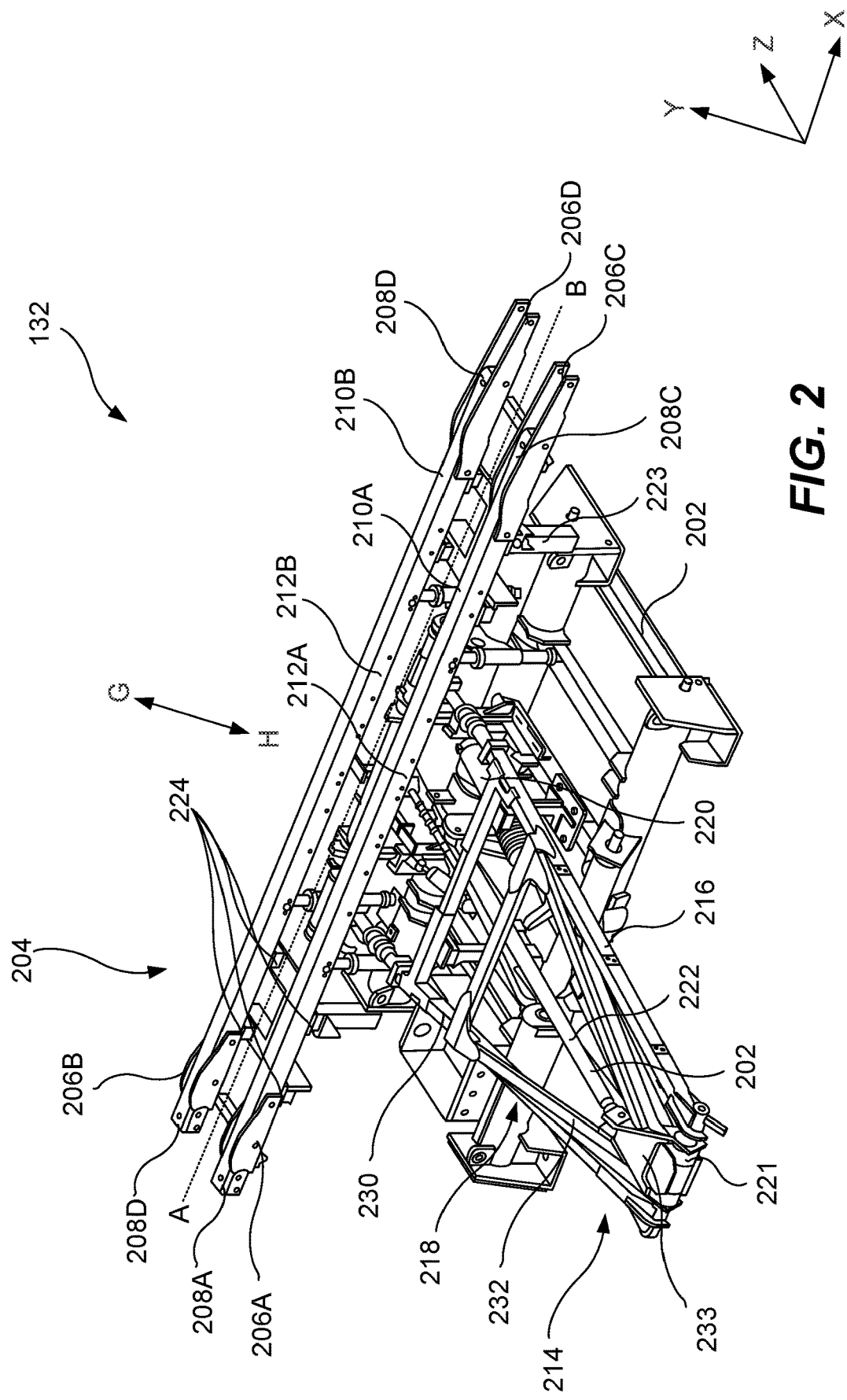
FIG. 2 illustrates a pantograph assembly, in accordance with one or more examples of the present disclosure.

FIG. 2 illustrates the pantograph assembly 132, in accordance with one or more examples of the present disclosure. The pantograph assembly 132 includes a base frame 202, and a pan head 204 movably connected (e.g., vertically along the Y-axis shown in FIG. 2) to the base frame 202. The base frame 202 is used to mount the pantograph assembly 132 onto the work machine 100 of FIG. 1. The base frame 202 is mounted using various affixing technologies such as nuts and bolts, welding, and the like. The base frame 202 may be electrically insulated (not shown) from the work machine 100 using various insulation technologies. The pan head 204 is used to electrically and physically connect the pantograph assembly 132 to the overhead conductors 134 when the pantograph assembly 132 is in an extended position whereby the pan head 204 is extended along the Y-axis as shown in FIG. 1.

Connecting the pan head 204 electrically and physically to the overhead conductors 134 provides for the flow of electrical power from the overhead conductors 134 to the work machine 100. The pan head 204 includes end horn insulators 206A-206D that electrically insulate end horns 208A-208D. The end horns 208A-208D are non-conducting elements of the pan head 204 that are used as terminal members for carbon brushes 210A and 210B (in the alternatively termed conductive brushes 210A and 210B). The carbon brushes 210A and 210B are the electrically conductive members of the pan head 204 that are in contact with and receive electrical power from the overhead conductors 134. The end horn insulators 206A-206D electrically and physically insulate the end horns 208A-208D from the overhead conductors 134 should a lateral movement of the work machine 100 cause the pan head 204 to be in a position that, without the end horn insulators 206A-206D, the end horns 208A-208D would contact the overhead conductors 134, potentially causing damage to the pantograph assembly 132 and/or the work machine 100. The carbon brushes 210A and 210B are installed onto the pan rails 212A and 212B along longitudinal axis AB of the pan rails 212A and 212B.

The pantograph assembly 132 further includes articulated assembly 214. The articulated assembly 214 is connected to the base frame 202. The articulated assembly 214 includes a first link 216 hingedly connected to the base frame 202 and a second link 218 hingedly connected to the first link 216 through hinge 221. The hinge 221 rotatably connects the first link 216 to the second link 218, allowing the first link 216 to tilt or rotate upwards along the Y-axis with respect to the second link 218 using lifting mechanism 220. The lifting mechanism 220 is a hydraulic or compressed air-based piston-cylinder mechanism that, when activated, uses a thrust rod 222 to force the second link 218 to rotate with respect to the first link 216, raising the pan head 204 in the direction from H to G along the Y-axis relative to a pan base 223 to cause the carbon brushes 210A and 210B to contact the overhead conductors 134. The deactivation of the lifting mechanism 220 allows the pan head 204 to lower or retract, in some examples using the force of gravity acting on the pan head 204, in the direction from G to H along the Y-axis to a resting position on the pan base 223 (the position illustrated in FIG. 2).

When in the lowered or retracted position, as illustrated in FIG. 2, the pan head 204 is in a resting position on the pan base 223. In some examples, the pan head 204 is not securely affixed to the pan base 223, such as locked or immovably affixed (such as when the pantograph assembly 132 is not in use or is stowed for future use). Being locked and stowed can reduce or eliminate the movement of the pan head 204 with respect to the pan base 223. However, the locked or stowed configuration may not be feasible or usable when the pan head 204 is temporarily lowered. This unsecured, resting position may occur when the pan head 204 is temporarily lowered into the resting position while the work machine 100 is being used, with the expectation that the pan head 204 may be extended or raised to provide electrical power thereafter. For example, the work machine 100 may be in a position moving from one set of overhead conductors 134 to another set of overhead conductors 134, thus requiring a temporary lowering of the pan head 204. In another example, the work machine 100 may be in a location in which the overhead conductors 134 are not available for use. The presently disclosed subject matter is not limited to any particular reason for the lowering of the pan head 204.

When in the lowered position, the work machine 100 may experience road conditions that cause the work machine 100 to move in various directions. These movements of the work machine 100 may be translated to the pantograph assembly 132. If not securely affixed, or stowed, the movements of the work machine 100 can cause a movement of the pan head 204 along the X-axis, Y-axis and the Z-axis with respect to, or relative to, the pan base 223. To reduce the impact of these relative movements, the pantograph assembly 132 includes force dampeners 224. The force dampeners 224 act as shock absorbers and are designed to reduce the impact of relational movement between the pan head 204 and the pan base 223 onto the pantograph assembly 132, illustrated in more detail in FIGS. 3 and 4, below. Additionally, the force dampeners 224 are shaped in a manner which limits relational movement between the pan head 204 and the pan base 223.

Figure 3:
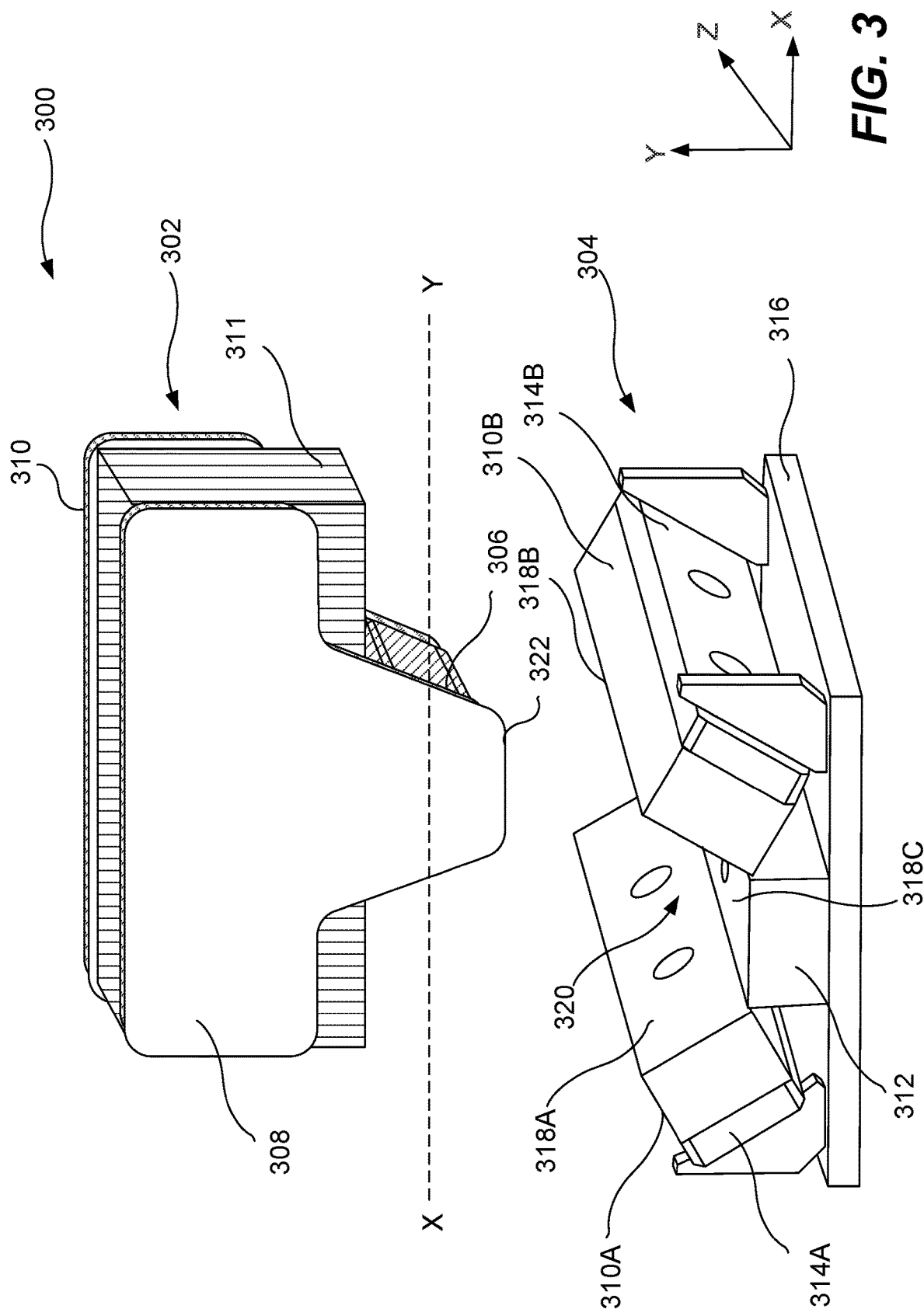
FIG. 3 illustrates a force dampener that may be used with a pantograph assembly, in accordance with one or more examples of the present disclosure.

FIG. 3 illustrates a force dampener 300 that may be used with a pantograph assembly, in accordance with one or more examples of the present disclosure. The force dampener 300 includes an upper section 302 and a lower section 304. The upper section 302 is installed onto the pan head 204, whereas the lower section 304 is installed onto the pan base 223. The upper section 302 includes a shoe 306 mounted between a front plate 308 and a back plate 310, the shoe 306 acting as an engagement mechanism of the upper section 302. The shape of the front plate 308, back plate 310, and shoe 306 may be described as a "V-block." The front plate 308 and the back plate 310 are spatially aligned using an alignment block 311. The lower section 304 includes side pads 310A and 310B and a bottom pad 312. In some examples, the side pads 310A and 310B and/or the bottom pad 312 are constructed of an elastic or partially elastic (deformable material) polymer, plastic, or silicone. In other examples, the side pads 310A and 310B and/or the bottom pad 312 are constructed of a fluid-filled sack that is designed to absorb at least a portion of a force, whereby the fluid includes an oil. In some examples, the shoe 306 is constructed from an elastic or partially elastic (deformable material) polymer, plastic, silicone, ceramic, or a metal or metal alloy. In still further examples, the alignment block 311 may be integrally formed (a single machined or constructed component) with the shoe 306 formed from elastic or partially elastic (deformable material) polymer, plastic, silicone, ceramic, or a metal or metal alloy. In an additional example, the shoe 306, the alignment block 311, the front plate 308, and the back plate 310 are integrally formed (a single machined or constructed component) with the shoe 306 formed from elastic or partially elastic (deformable material) polymer, plastic, silicone, ceramic, or a metal or metal alloy. In still further examples, the upper section 302 is formed using a single back plate 310 or front plate 308.

The side pad 310A is installed on backer plate 314A and the side pad 310B is installed on the backer plate 314B. The backer plates 314A and 314B and the bottom pad 312 are installed on a bottom plate 316.

Alternatively, a single plate made by casting or additive manufacturing and shaped to receive side pads 310A and 310B and bottom pad 312 could be provided. An exterior surface 318A of the side pad 310A, and exterior surface 318B of the side pad 310B, and an exterior surface 318C of the bottom pad 312 are positioned to provide a receiving section 320. The receiving section 320 is sized and shaped to receive an exterior surface 322 of the shoe 306 (as shown in FIG. 3, shoe 306 has a generally trapezoidal projection and receiving section 320 has a generally trapezoidal cavity). When the pan head 204 is lowered into a retracted position, the exterior surface 322 of the shoe 306 engages into the receiving section 320 whereby the exterior surface 322 comes into contact with the exterior surface 318C of the bottom pad 312. The generally trapezoidal shapes of shoe 306's projection and receiving section 320's cavity means that, when brought together as the pan head 204 is lowered toward pan base 223, they can be self-centering in the widthwise direction of the X-Y axis, helping to ensure the pan head 204 is properly positioned relative to the pan base 223.

As noted above, during the operation of the work machine 100, unless the pan head 204 is securely locked to the pan base 223, movements by the work machine 100 can cause the pan head 204 and the pan base 223 to move in different directions relative to each other. For example, if the work machine 100 hits a bump or pothole, the work machine 100 can quickly tilt in the lateral direction of axis XY from X to Y. Because the pan base 223 is secured to the work machine 100, the pan base 223 will also move in the lateral direction of axis XY from X to Y. However, in situations in which the pan head 204 is not locked onto the pan base 223 (thereby preventing relative motion between the pan head 204 and the pan base 223), the pantograph assembly 132 is flexible enough that the pan head 204 does not move initially when the pan base 223 moves, creating a relative motion between the pan head 204 and the pan base 223.

However, when the shoe 306 engages into the receiving section 320, whereby the exterior surface 322 comes into contact with the exterior surface 318C of the bottom pad 312, at least a portion of the forces can be absorbed by the exterior surface 318A of the side pad 310A, the exterior surface 318B of the side pad 310B, and the exterior surface 318C of the bottom pad 312. If there is relative motion between the pan head 204 and the pan base 223, forces created by the relative motion are absorbed by the movement of the shoe 306 onto the exterior surface 318A of the side pad 310A, the exterior surface 318B of the side pad 310B, and/or the exterior surface 318C of the bottom pad 312. The side pads 310A and 310B and the bottom pad 312 act as a shock absorber to absorb at least a portion of the force generated between the pan head 204 and the pan base 223. FIG. 3 illustrates an example force dampener 300. However, other shapes, numbers, and sizes may be used, illustrated by way of example in FIG. 4.

Figure 4:
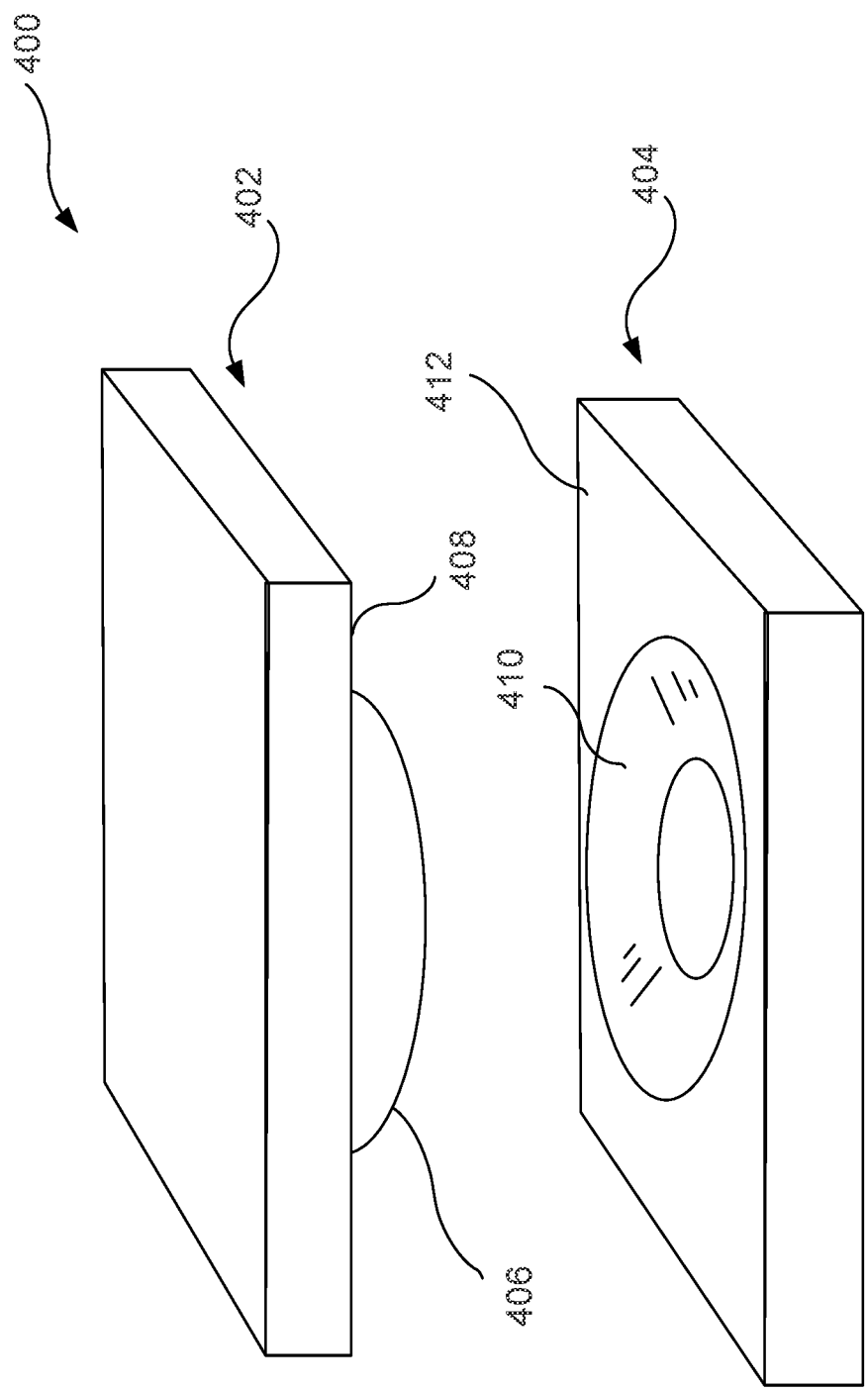
FIG. 4 illustrates an alternate example of a force dampener used to absorb at least a portion of forces imparted onto a pantograph assembly, in accordance with one or more examples of the present disclosure.

FIG. 4 is an illustration of an alternate example of a force dampener 400 used to absorb at least a portion of forces imparted onto the pantograph assembly 132, in accordance with one or more examples of the present disclosure. The force dampener 400 includes an upper section 402 and a lower section 404. The upper section 402 is installed onto the pan head 204, whereas the lower section 404 is installed onto the pan base 223. The upper section 402 includes an engagement dome 406 mounted onto (or, alternatively, integrally formed with) an exterior surface 408 of the upper section 402. In some examples, the engagement dome 406, the upper section 402, and/or the lower section 404 are constructed of an elastic or partially elastic (semi-deformable) polymer, plastic, or silicone. In other examples, the engagement dome 406, the upper section 402, and/or the lower section 404 are constructed of a fluid-filled sack that is designed to absorb at least a portion of a force. The lower section 404 has an engagement portion (or concavity) 410 defined by an exterior surface 412 of the lower section. When the pan head 204 is lowered onto the pan base 223, the exterior surface 408 of the upper section 402 moves towards and engages with the exterior surface 412 of the lower section 404. The engagement dome 406 moves into and settles into the engagement portion 410 of the exterior surface 412 of the lower section 404. If the shape of engagement portion (concavity) 410 is complementary to the engagement dome, for example, each corresponding to a portion of the surface of a sphere of certain size, the two parts will self-align in both widthwise and longitudinal directions as they come together vertically. When forces are imparted onto the pan head 204, engagement portion 410 acts to partially stabilize the engagement dome 406 and absorb lateral forces, stabilizing the pan head 204 in relation to the pan base 223. In the example illustrated in FIG. 4, the circular design of the engagement portion 410 and the engagement dome 406 can provide for force dampening for forces imparted in various directions along the X-axis, Z-axis, and Y-axis. For example, the pan head 204 may be pushed slightly upward due to a movement of the work machine 100 that forces the pan base 223 upwards. The initial force of the movement, in which the pan head 204 is forced into the pan base 223 because of the inertia of the pan head 204, can be absorbed by the force dampener 400. If the pan head 204 moves along the X-axis or the Z-axis, the impact of the pan head 204 onto the pan base 223 is absorbed at least in part by the engagement portion.

The force dampener 300 and the force dampener 400 help to absorb forces imparted onto the pantograph assembly 132 when the pantograph assembly 132 is in the retracted or lowered position. However, when in the raised or engaged position, the movement of the work machine 100 imparts forces onto the pantograph assembly 132 in a manner similar to when the pantograph assembly 132 is in the retracted or lowered position. Thus, the pantograph assembly 132 can include structural support members, as illustrated in FIG. 2.

Returning to the pantograph assembly 132 shown in FIG. 2, the second link 218 of the articulated assembly 214 includes A-frame 230. The A-frame 230 is connected to the pan head 204 and the hinge 221. When the lifting mechanism 220 is activated, the thrust rod 222 forces the A-frame 230 (as part of the second link 218) to rotate about the hinge 221, raising the pan head 204 for engagement with the overhead conductors 134. In both the lowered and the raised position, movements of the work machine 100 are translated as forces imparted onto the A-frame 230. Thus, during use, the A-frame 230 may consistently or nearly consistently experience forces that may cause early failure or damage to the A-frame 230. To help reduce the effect of the imparted forces, the second link 218 further includes support frame 232 and load block 233, described in more detail in FIG. 5.

FIG. 5 is an illustration of the second link 218, the A-frame 230, the support frame 232, and the load block 233, in accordance with one or more examples of the present disclosure. As shown in FIG. 5, the support frame 232 is mechanically affixed to the A-frame 230 left arm 234A and right arm 234B at attachment locations 236A and 236B. The support frame 232 is attached to the A-frame 230 using various technologies such as, but not limited to, welding, bolting, brazing, and the like. When attached to the A-frame 230, left arm 234A and right arm 234B at attachment locations 236A and 236B, respectively, the support frame 232 provides additional torsional support to the A-frame 230 when raised or lowered. During operation, the left arm 234A and the right arm 234B of the A-frame 230 are of sufficient lengths to provide enough of a distance between the work machine 100 and the overhead conductors 134 to allow for the full engagement of the pantograph assembly 132 to the overhead conductors 134. In some examples, the lengths of the left arm 234A and the right arm 234B may need to be relatively long to provide for the relatively long distance to extend the pantograph assembly 132 to ensure electrical and physical contact. However, a relatively longer arm may be more subject to force and torsion than a relatively shorter arm. Thus, the lengths of the left arm 234A and the right arm 234B may be subject to detrimental forces imparted on the pantograph assembly 132 caused by the movement of the work machine 100 than if the left arm 234A and the right arm 234B were relatively shorter.

The support frame 232 is installed onto the A-frame 230 to alleviate or reduce the effect of those torsional forces imparted onto the A-frame 230. Being installed at attachment locations 236A and 236B, the support frame 232 reduces the moment arm of the A-frame 230, reducing the ability of the imparted torsional forces to deform the A-frame 230 as the torsional forces are applied to the A-frame 230. By reducing the reducing the ability of the imparted torsional forces to deform the A-frame 230 as the torsional forces are applied to the A-frame 230, damage and/or wear and tear of the A-frame 230 may be reduced. Thus, the A-frame 230 can be sized to provide for the necessary height for full engagement, while still maintaining a lower moment arm to better withstand the effects of torsional forces imparted onto the A-frame 230.

The load block 233 is used to add structural rigidity to the support frame 232. Support frame left arm 238A is attached to the load block 233 at block location 240A and support frame right arm 238B is attached to the load block 233 at block location 240B. When torsional forces are applied to the support frame 232, the load block 233 provides a degree of structural rigidity to reduce or eliminate the deformation of the support frame 234 at the area of the load block 233 as the torsional forces are applied.

The presently disclosed subject matter also encompasses the subject matter set forth in the following clauses:

Clause 1: A work machine, comprising: an electric motor; a pantograph assembly providing a first source of electrical power to the electric motor, the pantograph assembly comprising; a pan head comprising at least one conductive brush for receiving electrical power from an overhead conductor when the pan head is in an extended position whereby the conductive brush is in electrical contact with the overhead conductor; a base frame connected to the work machine; an articulated assembly connected to the base frame, the articulated assembly comprising a first link hingedly connected to the base frame, and further comprising a second link hingedly connected to the first link; a lifting mechanism configured to force the second link to rotate with respect to the first link, thereby raising the pan head to the extended position from a lowered position; a pan base connected to the base frame, the pan base configured to receive the pan head when the pan head is in the lowered position; and at least one force dampener to absorb at least a portion of a force imparted by a work machine movement onto the pan head when the pan head is in the lowered position, the force dampener comprising: an upper section connected to the pan head, the upper section comprising an engagement mechanism; a lower section connected to the pan base, wherein at least a portion of the lower section comprises a deformable material, the engagement mechanism engages with a receiving section of the lower section when the pan head is in the lowered position, and the deformable material is configured to absorb at least a portion of energy imparted to the pan head, via the engagement mechanism, due to relative motion between the pan head and the pan base.

Clause 2: The work machine of clause 1, wherein the upper section comprises: at least one plate; and wherein the engagement mechanism comprises a shoe constructed from an elastic polymer, plastic, silicone, or fluid-filled sack.

Clause 3: The work machine of clause 1 or 2, wherein the lower section comprises; a first backer plate having a first side pad connected on the first backer plate; a second backer plate having a second side pad connected on the second backer plate; a bottom pad; and wherein the receiving section is defined by a first exterior surface of the first side pad, a second exterior surface of the second side pad, and a third exterior surface of the bottom pad.

Clause 4: The work machine of any of clauses 1-3, wherein the upper section further comprises: a second plate; and an alignment block configured to spatially align the at least one plate with the second plate.

Clause 5: The work machine of any of clauses 1-4, wherein the upper section comprises an engagement dome connected to an exterior surface of the upper section.

Clause 6: The work machine of any of clauses 1-5, wherein the lower section comprises an engagement section defined by an exterior surface of the lower section, the engagement section sized to receive at least a portion of the engagement dome when the pan head is placed in the lowered position.

Clause 7: The work machine of any of clauses 1-6, wherein the second link comprises: an A-frame connected to the pan head whereby when the lifting mechanism is activated, a thrust rod forces the A-frame to rotate about the hinge, raising the pan head to the extended position, and wherein when the lifting mechanism is deactivated, the thrust rod retracts, allowing the A-frame to lower to lower the pan head to the lowered position; and a support frame connected to a right arm of the A-frame and a left arm of the A-frame, the support frame configured to provide structural rigidity to the A-frame.

Clause 8: The work machine of any of clauses 1-7, wherein the second link further comprises a load block, wherein a left arm of the support frame and a right arm of the support frame are connected to the load block.

Clause 9: A pantograph assembly, comprising: a pan head comprising at least one conductive brush for receiving electrical power from an overhead conductor when the pan head is in an extended position and the conductive brush is in electrical contact with the overhead conductor; a base frame configured to be connected to a work machine; an articulated assembly connected to the base frame, the articulated assembly comprising a first link hingedly connected to the base frame, and a second link hingedly connected to the first link; a lifting mechanism which, when engaged, causes the second link to rotate with respect to the first link, thereby raising the pan head to the extended position from a lowered position; a pan base connected to the base frame, the pan base configured to receive the pan head when the pan head is in the lowered position; and at least one force dampener to absorb at least a portion of a force imparted by a motion of the pantograph assembly onto the pan head when the pan head is in the lowered position, the force dampener comprising: an upper section connected on the pan head, the upper section comprising an engagement mechanism; a lower section connected on the pan base, wherein at least a portion of the lower section comprises a deformable material, wherein the engagement mechanism of the upper section engages with a receiving section of the lower section when the pan head is in the lowered position; and the deformable material configured to absorb at least a portion of energy imparted onto the pan head transferred through the engagement mechanism caused by a relative motion of between the pan head and the pan base.

Clause 10: The pantograph assembly of clause 9, wherein the upper section comprises: a front plate; a back plate; an alignment block configured to spatially align the front plate with the back plate; and wherein the engagement mechanism comprises a shoe constructed from an elastic polymer, plastic, silicone, or fluid-filled sack.

Clause 11: The pantograph assembly of any of clauses 9-10, wherein the lower section comprises; a first backer plate having a first side pad connected to the first backer plate; a second backer plate having a second side pad connected to the second backer plate; a bottom pad; and wherein the receiving section is defined by a first exterior surface of the first side pad, a second exterior surface of the second side pad, and a third exterior surface of the bottom pad.

Clause 12: The pantograph assembly of any of clauses 9-11, wherein the side pads or the bottom pad are constructed from an elastic or partially elastic polymer, plastic, silicone, or a fluid-filled sack.

Clause 13: The pantograph assembly of any of clauses 9-12, wherein the upper section comprises an engagement dome connected to an exterior surface of the upper section.

Clause 14: The pantograph assembly of any of clauses 9-13, wherein the lower section comprises an engagement section defined by an exterior surface of the lower section, the engagement section sized to receive at least a portion of the engagement dome when the pan head is placed in the lowered position.

Clause 15: The pantograph assembly of any of clauses 9-14, wherein the second link comprises: an A-frame connected to the pan head whereby when the lifting mechanism is activated, a thrust rod forces the A-frame to rotate about the hinge, raising the pan head to the extended position, and wherein when the lifting mechanism is deactivated, the thrust rod retracts, allowing the A-frame to lower to lower the pan head to the lowered position; and a support frame connected to a right arm of the A-frame and a left arm of the A-frame, the support frame configured to provide structural rigidity to the A-frame.

Clause 16: The pantograph assembly of any of clauses 9-15, wherein the second link further comprises a load block, wherein a left arm of the support frame and a right arm of the support frame are connected to the load block.

Clause 17: A force dampener for a pantograph assembly, the force dampener comprising: an upper section configured to be installed on a pan head, the upper section comprising an engagement mechanism; a lower section configured to be installed on a pan base, wherein at least a portion of the lower section comprises a deformable material, wherein the engagement mechanism of the upper section engages with a receiving section of the lower section when the pan head is in the lowered position; and the deformable material configured to absorb at least a portion of energy imparted by a work machine movement onto the pan head transferred through the engagement mechanism caused by a relative motion of between the pan head and the pan base.

Clause 18: The force dampener of clause 17, wherein the upper section comprises: a front plate; a back plate; an alignment block configured to spatially align the front plate with the back plate; and wherein the engagement mechanism comprises a shoe constructed from an elastic polymer, plastic, silicone, or fluid-filled sack.

Clause 19: The force dampener of clause 17 or 18, wherein the lower section comprises; a first backer plate having a first side pad installed on the first backer plate; a second backer plate having a second side pad installed on the second backer plate; a bottom pad; and wherein the receiving section is defined by a first exterior surface of the first side pad, a second exterior surface of the second side pad, and a third exterior surface of the bottom pad.

Clause 20: The force dampener of any of clauses 17-19, wherein the first side pad, the second side pad, or the bottom pad are constructed from an elastic or partially elastic polymer, plastic, silicone, or a fluid-filled sack.

Clause 21: A work machine, comprising: an electric motor; a pantograph assembly providing a first source of electrical power to the electric motor, the pantograph assembly comprising; a pan head comprising at least one conductive brush for receiving electrical power from an overhead conductor when the pan head is in an extended position whereby the conductive brush is in electrical contact with the overhead conductor; a base frame connected to the work machine; an articulated assembly connected to the base frame, the articulated assembly comprising a first link hingedly connected to the base frame, and further comprising a second link hingedly connected to the first link, wherein the second link includes an A-frame connected to the pan head whereby when the lifting mechanism is activated, a thrust rod forces the A-frame to rotate about the hinge, raising the pan head to the extended position, and wherein when the lifting mechanism is deactivated, the thrust rod retracts, allowing the A-frame to lower to lower the pan head to the lowered position, and a support frame connected to a right arm of the A-frame and a left arm of the A-frame, the support frame configured to provide structural rigidity to the A-frame.

Clause 22. The work machine of clause 21, wherein the second link further comprises a load block, wherein a left arm of the support frame and a right arm of the support frame are connected to the load block.

Clause 23: A pantograph assembly, comprising: a pan head comprising at least one conductive brush for receiving electrical power from an overhead conductor when the pan head is in an extended position and the conductive brush is in electrical contact with the overhead conductor; a base frame configured to be connected to a work machine; an articulated assembly connected to the base frame, the articulated assembly comprising a first link hingedly connected to the base frame, and a second link hingedly connected to the first link; a lifting mechanism which, when engaged, causes the second link to rotate with respect to the first link, thereby raising the pan head to the extended position from a lowered position, wherein the second link includes an A-frame connected to the pan head whereby when the lifting mechanism is activated, a thrust rod forces the A-frame to rotate about the hinge, raising the pan head to the extended position, and wherein when the lifting mechanism is deactivated, the thrust rod retracts, allowing the A-frame to lower to lower the pan head to the lowered position, and a support frame connected to a right arm of the A-frame and a left arm of the A-frame, the support frame configured to provide structural rigidity to the A-frame.

INDUSTRIAL APPLICABILITY

The present disclosure describes a pantograph assembly 132 that users force dampening to reduce the effect of forces imparted onto the pantograph assembly 132 during the movement of the work machine 100. Various examples of the presently disclosed subject matter use force dampeners 224 to absorb forces caused by the relational movement of the pan head 204 to the pan base 223 when the pan head 204 is in the lowered position. Acting as shock absorbers and displacement limiters, the force dampeners 224 absorb a degree of the forces, reducing wear and tear, and potentially damage, to the pantograph assembly 132. Reducing wear and tear can help increase the useful lifespan of the pantograph assembly 132, potentially reducing costs and increasing safety. The present disclosure further describes the use of the support frame 232 to provide structural support to the A-frame 230, also reducing wear and tear, and potentially damage, to the pantograph assembly 132.

Unless explicitly excluded, the use of the singular to describe a component, structure, or operation does not exclude the use of plural such components, structures, or operations or their equivalents. As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

While aspects of the present disclosure have been particularly shown and described with reference to the embodiments above, it will be understood by those skilled in the art that various additional embodiments may be contemplated by the modification of the disclosed machines, systems, and methods without departing from the spirit and scope of what is disclosed. Such embodiments should be understood to fall within the scope of the present disclosure as determined based upon the claims and any equivalents thereof.

What is claimed is:

1. A work machine, comprising:
   an electric motor;
   a pantograph assembly providing a first source of electrical power to the electric motor, the pantograph assembly comprising;
      a pan head comprising at least one conductive brush for receiving electrical power from an overhead conductor when the pan head is in an extended position whereby the conductive brush is in electrical contact with the overhead conductor;
      a base frame connected to the work machine;
      an articulated assembly connected to the base frame, the articulated assembly comprising a first link hingedly connected to the base frame, and further comprising a second link hingedly connected to the first link;
      a lifting mechanism configured to force the second link to rotate with respect to the first link, thereby raising the pan head to the extended position from a lowered position;
      a pan base connected to the base frame, the pan base configured to receive the pan head when the pan head is in the lowered position; and
      at least one force dampener to absorb at least a portion of a force imparted by a work machine movement onto the pan head when the pan head is in the lowered position, the force dampener comprising:
         an upper section connected to the pan head and comprising an engagement mechanism and an engagement dome, the engagement dome connected to an exterior surface of the upper section;
         a lower section connected to the pan base, wherein
            at least a portion of the lower section comprises a deformable material,
            the engagement mechanism engages with a receiving section of the lower section when the pan head is in the lowered position, and
            the deformable material is configured to absorb at least a portion of energy imparted to the pan head, via the engagement mechanism, due to relative motion between the pan head and the pan base.

2. The work machine of claim 1, wherein the upper section comprises:
   at least one plate; and
   wherein the engagement mechanism comprises a shoe constructed from an elastic polymer, plastic, silicone, or fluid-filled sack.

3. The work machine of claim 2, wherein the lower section comprises;
   a first backer plate having a first side pad connected on the first backer plate;
   a second backer plate having a second side pad connected on the second backer plate;
   a bottom pad; and
   wherein the receiving section is defined by a first exterior surface of the first side pad, a second exterior surface of the second side pad, and a third exterior surface of the bottom pad.

4. The work machine of claim 2, wherein the upper section further comprises:
   a second plate; and
   an alignment block configured to spatially align the at least one plate with the second plate.

5. The work machine of claim 1, wherein the lower section comprises an engagement section defined by an exterior surface of the lower section, the engagement section sized to receive at least a portion of the engagement dome when the pan head is placed in the lowered position.

6. The work machine of claim 1, wherein the second link comprises:
   an A-frame connected to the pan head whereby when the lifting mechanism is activated, a thrust rod forces the A-frame to rotate about a hinge, raising the pan head to the extended position, and wherein when the lifting mechanism is deactivated, the thrust rod retracts, allowing the A-frame to lower to lower the pan head to the lowered position; and
   a support frame connected to a right arm of the A-frame and a left arm of the A-frame, the support frame configured to provide structural rigidity to the A-frame.

7. The work machine of claim 6, wherein the second link further comprises a load block, wherein a left arm of the support frame and a right arm of the support frame are connected to the load block.

8. A pantograph assembly, comprising:
a pan head comprising at least one conductive brush for receiving electrical power from an overhead conductor when the pan head is in an extended position and the conductive brush is in electrical contact with the overhead conductor;
a base frame configured to be connected to a work machine;
an articulated assembly connected to the base frame, the articulated assembly comprising a first link hingedly connected to the base frame, and a second link hingedly connected to the first link;
a lifting mechanism which, when engaged, causes the second link to rotate with respect to the first link, thereby raising the pan head to the extended position from a lowered position;
a pan base connected to the base frame, the pan base configured to receive the pan head when the pan head is in the lowered position; and
at least one force dampener to absorb at least a portion of a force imparted by a motion of the pantograph assembly onto the pan head when the pan head is in the lowered position, the force dampener comprising:
an upper section connected on the pan head and comprising an engagement mechanism and an engagement dome, the engagement dome connected to an exterior surface of the upper section;
a lower section connected on the pan base, wherein at least a portion of the lower section comprises a deformable material, wherein the engagement mechanism of the upper section engages with a receiving section of the lower section when the pan head is in the lowered position; and
the deformable material configured to absorb at least a portion of energy imparted onto the pan head transferred through the engagement mechanism caused by a relative motion of between the pan head and the pan base.

9. The pantograph assembly of claim 8, wherein the upper section comprises:
a front plate;
a back plate;
an alignment block configured to spatially align the front plate with the back plate; and
wherein the engagement mechanism comprises a shoe constructed from an elastic polymer, plastic, silicone, or fluid-filled sack.

10. The pantograph assembly of claim 9, wherein the lower section comprises;
a first backer plate having a first side pad connected to the first backer plate;
a second backer plate having a second side pad connected to the second backer plate;
a bottom pad; and
wherein the receiving section is defined by a first exterior surface of the first side pad, a second exterior surface of the second side pad, and a third exterior surface of the bottom pad.

11. The pantograph assembly of claim 10, wherein the first side pad, the second side pad, or the bottom pad are constructed from an elastic or partially elastic polymer, plastic, silicone, or a fluid-filled sack.

12. The pantograph assembly of claim 8, wherein the lower section comprises an engagement section defined by an exterior surface of the lower section, the engagement section sized to receive at least a portion of the engagement dome when the pan head is placed in the lowered position.

13. The pantograph assembly of claim 8, wherein the second link comprises:
an A-frame connected to the pan head whereby when the lifting mechanism is activated, a thrust rod forces the A-frame to rotate about a hinge, raising the pan head to the extended position, and wherein when the lifting mechanism is deactivated, the thrust rod retracts, allowing the A-frame to lower to lower the pan head to the lowered position; and
a support frame connected to a right arm of the A-frame and a left arm of the A-frame, the support frame configured to provide structural rigidity to the A-frame.

14. The pantograph assembly of claim 13, wherein the second link further comprises a load block, wherein a left arm of the support frame and a right arm of the support frame are connected to the load block.

15. A force dampener for a pantograph assembly, the force dampener comprising:
an upper section configured to be installed on a pan head and comprising an engagement mechanism and an engagement dome, the engagement dome connected to an exterior surface of the upper section;
a lower section configured to be installed on a pan base, wherein at least a portion of the lower section comprises a deformable material, wherein the engagement mechanism of the upper section engages with a receiving section of the lower section when the pan head is in the lowered position; and
the deformable material configured to absorb at least a portion of energy imparted by a work machine movement onto the pan head transferred through the engagement mechanism caused by a relative motion of between the pan head and the pan base.

16. The force dampener of claim 15, wherein the upper section comprises:
a front plate;
a back plate;
an alignment block configured to spatially align the front plate with the back plate; and
wherein the engagement mechanism comprises a shoe constructed from an elastic polymer, plastic, silicone, or fluid-filled sack.

17. The force dampener of claim 15, wherein the lower section comprises;
a first backer plate having a first side pad installed on the first backer plate;
a second backer plate having a second side pad installed on the second backer plate;
a bottom pad; and
wherein the receiving section is defined by a first exterior surface of the first side pad, a second exterior surface of the second side pad, and a third exterior surface of the bottom pad.

18. The force dampener of claim 17, wherein the first side pad, the second side pad, or the bottom pad are constructed from an elastic or partially elastic polymer, plastic, silicone, or a fluid-filled sack.

* * * * *